(12) United States Patent
Harrington et al.

(10) Patent No.: US 7,429,625 B2
(45) Date of Patent: Sep. 30, 2008

(54) INVERSION OF INVERSE EMULSION POLYMERS

(75) Inventors: John C. Harrington, Jacksonville, FL (US); Robert A. Gelman, Newark, DE (US); K. Abraham Vaynberg, Cherry Hill, NJ (US)

(73) Assignee: Hercules Incorporated, Wilmington, DE (US)

( * ) Notice: Subject to any disclaimer, the term of this patent is extended or adjusted under 35 U.S.C. 154(b) by 311 days.

(21) Appl. No.: 11/011,985

(22) Filed: Dec. 14, 2004

(65) Prior Publication Data

US 2005/0143506 A1  Jun. 30, 2005

Related U.S. Application Data

(60) Provisional application No. 60/529,715, filed on Dec. 15, 2003.

(51) Int. Cl.
*C08J 3/02* (2006.01)
*C08J 3/03* (2006.01)
*C08F 2/32* (2006.01)

(52) U.S. Cl. .................. 524/376; 524/377; 524/501; 524/512; 524/801

(58) Field of Classification Search .............. 524/376, 524/377, 501, 612, 801
See application file for complete search history.

(56) References Cited

U.S. PATENT DOCUMENTS

| 3,284,393 | A |   | 11/1966 | Vanderhoff et al. | 260/29.6 |
|---|---|---|---|---|---|
| 3,624,019 | A |   | 11/1971 | Anderson et al. | 260/29.6 |
| 3,734,873 | A |   | 5/1973 | Anderson et al. | 260/29.6 |
| RE28,474 | E |   | 7/1975 | Anderson et al. | 260/29.6 |
| RE28,576 | E |   | 10/1975 | Anderson et al. | 260/29.6 |
| 4,022,731 | A | * | 5/1977 | Schmitt | 523/336 |
| 4,264,742 | A | * | 4/1981 | Golden et al. | 521/64 |
| 4,431,548 | A | * | 2/1984 | Lipowski et al. | 210/732 |
| 5,185,393 | A | * | 2/1993 | Kanda et al. | 524/140 |
| 5,925,714 | A | * | 7/1999 | Larson et al. | 524/827 |

FOREIGN PATENT DOCUMENTS

EP          140223 A * 5/1985

* cited by examiner

*Primary Examiner*—Kelechi C Egwim
(74) *Attorney, Agent, or Firm*—Joanne Mary Fobare Rossi

(57) ABSTRACT

A method to invert an inverse emulsion water compatible polymer product using a combination of surfactants that have specific chemical structures is disclosed. A combination, or blend, of two or more surfactants provides for an effective breaker system. The blend of surfactants is more effective than the individual surfactants.

16 Claims, No Drawings

INVERSION OF INVERSE EMULSION POLYMERS

This application claims the benefit of U.S. Provisional Application No. 60/529,715, filed Dec. 15, 2003, the entire contents of which is hereby incorporated by reference.

BACKGROUND OF THE INVENTION

1. Field of the Invention

The field of this invention is the inversion of inverse emulsion polymer products. This invention relates to the use of combinations of surfactants to improve the inversion of water-in-oil (w/o) inverse emulsion polymers.

2. Description of Related Art

An inverse, or water-in-oil, polymerization is utilized on a commercial scale to prepare high molecular weight water-compatible polymers. The water-in-oil emulsion polymer is termed in the scientific literature to be an inverse emulsion; this is based on its historical evolution as a variation of the oil-in-water (o/w) or latex emulsion technology, where water insoluble polymers are dispersed in an aqueous medium. Inverse emulsion refers to an aqueous (water) phase dispersed in a non-aqueous (oil) phase, where the aqueous phase and oil phase can also be referred to as the respective discontinuous and continuous phases. The resultant water-compatible polymers are in the discontinuous aqueous phase.

The advantages of this process include the ability to prepare high molecular weight, water-compatible polymer in a low viscosity, high solids form. This process produces emulsions that are 20-50% polymer, exhibit low viscosity, and the polymer can have a molecular weight in the tens of millions. In contrast, other methods for preparation of high molecular weight water-soluble polymers include solution polymerization of water-soluble monomers, which results in a low solids solution (<5% polymer), and/or high solution viscosity, and/or lower product molecular weight. The low product solids can also be more costly to ship.

Inverse emulsion polymers are prepared and stabilized using surface active agents, more commonly known as surfactants. The surfactants utilized will permit the emulsification of the water soluble monomer in the oil phase prior to polymerization, and provide stability to the resultant emulsion polymer. Stability, which includes resistance to settling, minimal changes in viscosity with time and premature inversion, not to mention the need for a stable emulsion during the polymerization process, requires a robust emulsion stabilization package. Emulsion surfactant systems have been developed that provide excellent emulsion stability.

Inversion of the emulsion refers to the process prior to use, where the phases are reversed, and the polymer is released from the discontinuous phase. Addition of a large volume of aqueous solution is a key aspect of the inversion process. This results in a continuous aqueous (water) phase where the coalescence of the previously dispersed aqueous phase results in the dispersal of the polymer in solution, resulting in a viscosification of the solution. Inversion is assisted by the addition of surfactants, termed 'breaker surfactants', to the emulsion that will help disrupt the original emulsion stabilization system when the relatively large volume of water is combined, using some level of agitation or shear, with the water-in-oil emulsion. It is the joint action of these three factors, the large volume of dispersed phase, the shear forces, and the breaker surfactant(s), that results in the inversion, or phase reversal, of the emulsion. Moreover, the polymer is now available to interact with other aqueous phase materials. The relative smaller amount of oil (20-40% by weight of the original emulsion) becomes dispersed in the water phase, where, due to the addition of the large volume of aqueous solution, the oil is a minor component.

The polymer is inverted into an aqueous solution, such that the resultant concentration of active polymer typically ranges from 0.1% to 1.0% by weight. The concentration utilized depends upon numerous factors, including but not limited to, the water chemistry and temperature, solution viscosity, feed rates, and equipment size and flow rates.

The emulsion polymer may be inverted into an aqueous solution utilizing either a batch, continuous, or semi-continuous system. In a batch process, the neat emulsion is fed into the agitator vortex of a vessel containing water until the target concentration is achieved. The polymer is then mixed until homogenous. In a continuous or semi-continuous system, convergent flows of water and neat emulsion at the desired concentrations are allowed to contact. The resultant mixture is then passed through a mixing stage, such as a static mixer or mechanical pump, where the mixing action enhances the inversion process. The aqueous solution is then typically transferred into a tank, where it is mixed until homogenous. In a continuous system the step of transferring to a tank is eliminated.

Additional dilution water is typically added to the inverted polymer solution just prior to introduction into the process to aid in dispersal of the polymer.

It is known that the use of an additional surfactant helps facilitate the inversion of the emulsion and the introduction into and subsequent viscosification of the now continuous water phase; this surfactant is often termed an 'inverter', 'inverting surfactant' or 'breaker' (the term 'breaker' will be used). To avoid confusion, the term 'emulsification surfactant' is used here to refer to surfactant(s) used to stabilize the emulsion. The term 'breaker surfactant' is used to refer to surfactant(s) used to break or invert the emulsion. The term 'emulsion stabilization package or system' refers to one or more emulsification surfactants. The term 'breaker package or system' refers to one or more breaker surfactants.

Breaker surfactant(s) are typically added after polymerization into the resultant emulsion polymer, but can be added as part of the emulsion stabilization package. These emulsions are called self-inverting surfactants, as they will self invert under the conditions of high shear in an excess of water. Alternatively, the breaker surfactant(s) can be added to the inverse emulsion at the application site, or can be added to the water prior to the addition of the inverse emulsion. The inversion step is critical to the utility of the emulsion polymer product, for it places the polymer in the continuous aqueous phase where it can then act as a flocculant, coagulant, dispersant, or rheological agent.

The commercial viability of water-in-oil emulsions is dependent on the ability to easily and effectively invert the emulsion. The time required to invert the emulsion is an important product attribute. The time period for a solution to reach its maximum viscosity is a good measure of inversion time, as this is an indication the polymer has fully equilibrated from the emulsion into the aqueous solution. Another indication of inversion time is the solution conductivity after polymer addition. A poorly inverting emulsion will exhibit low conductivity as the polymer remains within the discontinuous phase, whereas an emulsion with good inversion properties will exhibit a high conductivity after introduction into water, as the polymer has dispersed into the aqueous solution.

Inversion is typically done just prior to use at the application site. Key to this process is selection of the breaker surfactant system. The breaker surfactant system must have a chemical nature that will help disrupt the original emulsion stabilization system during the inversion process, facilitating reversal of the phases, and permit the polymer to be fully introduced into the aqueous solution. However, the other key requirement for a commercially viable emulsion product is that the emulsion must be stable during the period between manufacture and use. Thus, a balance must exist between product stability and ease of inversion.

Emulsion surfactant systems for use in inverse emulsion polymers have been developed that provide excellent emulsion stability; these systems, consequently, can be difficult to invert. Among the most difficult to invert stabilization systems are those that contain one or more diblock and triblock polymeric surfactants. Other inverse emulsion water-soluble polymer systems that are inherently difficult to invert are those where the polymer (or its monomers) contain hydrophobic groups or surface active groups.

Inverse emulsion polymerization is a standard chemical process for preparing high molecular weight water soluble polymers. Such processes are known to those skilled in the art, for example see U.S. Pat. No. 3,284,393 and Reissue U.S. Pat. Nos. 28,474 and 28,576. Use of breaker surfactants is known in the art see for example U.S. Pat. Nos. 3,624,019 and 3,734,873 which describe the inversion of inverse emulsion prepared by dissolving polymer powder into a water-in-oil emulsion, then affecting the inversion rate by the addition of an alkyl phenol ethoxylate to the emulsion or the water. U.S. Pat. No. 5,925,714 claims a self-inverting inverse emulsion where an alkoxylated castor oil is utilized at levels of 0.5% to 7.0% as the breaker surfactant. The invention is noted as an improvement in the polymer flocculant efficiency due to improved inversion.

It is known in the art to use polymeric surfactants to stabilize inverse emulsions. Polymeric emulsifying surfactant system may comprise one or more polymeric surfactants.

There remains a need in the field to find inversion systems that are more effective then those that are presently known.

BRIEF DESCRIPTION OF THE INVENTION

This invention pertains to the inversion of emulsion polymerization products. The invention pertains to a method of inverting a water in oil polymer emulsion comprising the steps of (a) providing a water in oil emulsion having a water compatible polymer (water soluble or water-dispersible) in the aqueous phase, (b) contacting the water in oil polymer emulsion with an effective amount of a combination of breaker surfactants comprising at least one polymeric surfactant and a second surfactant wherein the polymeric surfactants contains one or more hydrophilic groups, and (c) inverting the emulsion It has been found that a combination, or blend, of at least two surfactants is an effective breaker system. The combination of surfactants is more effective than the individual surfactants, and thus a synergistic effect is observed.

DETAILED DESCRIPTION OF THE INVENTION

The instant invention pertains to the use of polymeric surfactants having one or more hydrophilic segments as efficient breaker surfactant(s) for emulsion polymer products in combination with a non polymeric surfactant. The word efficient is used to describe rapid inversion, and a relatively rapid increase in solution viscosity to an equilibrium level.

It has been found that a combination, or blend, of at least two surfactants is an effective breaker system. The primary component, or primary breaker surfactant of the combination, is a polymeric surfactant that comprises at least one or more hydrophilic groups. The second or secondary breaker surfactant for use in combination with the polymeric surfactant is a non polymeric surfactant.

It has been found, unexpectedly, that certain combinations of surfactants are effective as breaker surfactants for inverse emulsion water compatible (water-soluble or water-dispersible) polymer products that are difficult to invert. These breaker surfactants are also effective in the inversion of most inverse emulsion polymerization products. The term water compatible polymer, for the purposes of this invention, include both water-soluble and water-dispersible polymers.

The present invention is directed to a method of inverting a water in oil polymer emulsion comprising the steps of (a) providing a water in oil emulsion having a water compatible polymer in the aqueous phase, (b) contacting the water in oil polymer emulsion with an effective amount of a surfactant combination of breaker surfactants comprising at least one polymeric surfactant and a second surfactant wherein the polymeric surfactants contains one or more hydrophilic groups and (c) inverting the emulsion.

It is not required that the breaker surfactants be added together or simultaneously. The primary and secondary breaker surfactants can be added to the emulsion together, as a blend, or alternatively can be added to the emulsion separately or individually in either order. The breaker-surfactants are generally added to the emulsion after the polymerization of the monomers that forms the polymer. A portion or all of the breaker surfactants can be added prior to polymerization of the monomers. The addition of the breaker surfactants can be also done anytime after the formation of the polymer. The polymer can remain in the water in oil emulsion state until it is ready to be used and then the breaker surfactants can be added.

Generally to invert the water in oil emulsion a large quantity of water is contacted with the water in oil emulsion. All or some of the breaker surfactants can optionally be added to the large quantity of water and then the large quantity of water containing some or all or the breaker surfactant can be contacted with the water in oil emulsion.

In one preferred embodiment of the invention the polymeric surfactant contains two or more hydrophilic groups.

In one embodiment of the invention the primary breaker surfactant is one in which at least one of the hydrophilic groups is a polyglycol group. In another embodiment of the invention the primary breaker surfactant is one in which at least two of the hydrophilic groups are polyglycol groups. It is not required that the two polyglycol groups have the same molecular weight and/or chemical structure.

The primary surfactant may be selected from a group that includes, but is not limited to, ethylene oxide (EO)/propylene oxide (PO) copolymers. EO-PO Co-polymers includes the subset of EO-PO block copolymers. The EO-PO copolymers are produced by the sequential reaction of one of the two monomers, either EO or PO, off a starter molecule. The starter molecule, sometimes referred to as the initiator, acts as the starting point of the EO or PO polymerization, and will be at the core of the resultant polymer. The other monomer, not utilized in the initial polymerization, is then reacted off the terminal hydroxyl groups of the initial polymer. Starter molecules are generally diols, triols, tetraols, pentaols, diamines, triamines and the like. Example starter molecules include ethylene glycol, diethylene glycol, propylene glycol, glycerol, trimethylol propane, pentaerythritol, ethylene diamine, and the like. The functionality of the starter molecule is the number of abstractable protons, and will determine the number of polymer chains propagating from the starter molecule core. For example, diols such as propylene glycol and diethylene glycol have a functionality of two, and would have two chains emanating from its core, and is thus a linear polymer. Ethylene diamine has a functionality of four, and would have four polymer chains emanating from the core, with the resultant polymer being tetrafunctional. Regardless of the functionality of the starter molecule, the resultant EO-PO copolymer can be further chain extended with diacids to further increase the polymer molecular weight. One known example of a diacid is fumaric acid.

Primary breaker surfactant examples include, but are not limited to, the following EO-PO copolymers: Pluronic® L62, Pluronic® L64, Pluronic® L101, and Pluronic® 25R4, all produced with a diol starter (products of BASF Corporation, Mount Olive, N.J.); Tetronic® 701, Tetronic® 704, Tetronic® 901 and Tetronic® 904 and Tetronic® 90R4, all produced with ethylene diamine starter (products of BASF Corporation, Mount Olive, N.J.); Polyglycol PT 7200, produced with glycerol starter (a product of Dow Chemical Company, Midland, Mich.); Pluracol® 380, produced with trimethylol propane starter (a product of BASF, Wyandotte, Mich.); and Witbreak® DGE-182, produced with glycerol starter, then chain extended with fumaric acid (a product of Akzo Nobel Surface Chemistry, Chicago, Ill.), and combinations thereof.

The second or secondary breaker surfactant for use in combination with the polymeric breaker surfactant is a non polymeric surfactant. Examples of the secondary breaker surfactant include, but not limited to, ethoxylated alcohols, alcohol ethoxylates, ethoxylated esters of sorbitan, ethoxylated esters of fatty acids, ethoxylated fatty acid esters and ethoxylated esters of sorbitol and fatty acids or combination of any of the preceding.

The polymeric breaker surfactant comprises from at least about 1.0%, preferably from at least about 2.0%, preferably from at least about 2.5% and more preferably from at least about 5% by weight of the combination of the breaker surfactants. The polymeric breaker surfactant can be up to about 98%, preferably up to about 75% by weight of the combination of the breaker surfactants. The polymeric breaker surfactant comprises from about 2.0% to about 98%, preferably from about 2.5% to about 75% and more preferably from about 5% to about 50% by weight of the combination of the breaker surfactants. It is preferred that the total amount of combined breaker surfactant is less than about 10%, or less than about 5%, preferably less than about 4% and most preferably less than or equal to about 3% of the total emulsion system. Amounts greater than 10% are contemplated by the present invention. However as the percent of surfactant increases the viscosity of the emulsion can increase to an unacceptable level. All percentages are based on weight.

Surfactants are materials that have a tendency to absorb at surfaces and interfaces. This is a fundamental property of a surfactant, with the stronger the tendency to accumulate at the interface, the better the surfactant. Surfactants are made up of both hydrophobic and hydrophilic parts. The word surfactant is an abbreviation for surface active agent. It is the presence of both the hydrophilic and hydrophobic parts that provides these materials with their surface active characteristics. An interface is the boundary between two immiscible phases, such as air/liquid or aqueous liquid/organic liquid.

A polymer is a large molecule that is composed of a number of small, relatively simple chemical units linked via covalent bonds. The chemical units are referred to in the art as monomers. A polymer can be considered to be a chain of monomer units. That is to say, the monomers are linked together via covalent bonds in a continuous fashion and are not simply pendant from a single molecule. The chain is often referred to as the backbone. A polymer can be composed of one or more monomers. For polymers composed of two or more monomers, the arrangement within the chain can be random, alternating, or block. Polymers having a block arrangement can be viewed as polymers composed of segments of single monomers bonded together. The polymer chain may be linear or branched.

A polymeric surfactant is a polymer that has surface active properties. Both the hydrophobic and hydrophilic parts of the surfactant are polymeric in nature. The structure of polymeric surfactants can be, but are not limited to, hydrophobic chains grafted onto a hydrophilic backbone, hydrophilic chains grafted onto a hydrophobic backbone, or alternating hydrophobic and hydrophilic segments.

For the purposes of this patent, a polymeric breaker surfactant is considered to be a molecule where both the hydrophilic and hydrophobic segments are composed of more than five (5) units (monomers) covalently bonded to another and the number average molecular weight of the polymeric breaker surfactant is greater than 500. As the term polymeric breaker surfactant is defined here, a surfactant with only one of its parts being polymeric in nature is excluded.

The surfactant concentration at an interface is dependent on the structure (chemical and physical) of the surfactant as well as the nature of the two phases that form the interface. Surfactants are said to be amphiphilic, indicating that they consist of at least two parts, one that is soluble in a specific fluid (the lyophilic part) and one that is insoluble (the lyophobic part). The terms hydrophilic and hydrophobic are used respectively, when the fluid is water. Polymeric surfactants include molecules where hydrophobic chains are grafted into a hydrophilic backbone polymer, hydrophilic chains are grafted into a hydrophobic backbone, and alternating hydrophobic and hydrophilic segments. For purposes of this invention a key differentiating factor for the polymeric surfactant is that both the hydrophobic and hydrophilic segments are polymeric. This is to differentiate the polymeric surfactant from surfactant structures where a polymeric hydrophilic segment is linked to a hydrophobic molecule. For purposes of the present invention surfactant structures where a polymeric hydrophilic segment is linked to a hydrophobic molecule are not included in polymeric breaker surfactants. Examples of such surfactant structures include, but are not limited to, ethoxylated fatty acids, ethoxylated fatty acid amines and ethoxylated alcohols.

Optionally, other materials can be added to the breaker surfactant system to enhance the action of the surfactants. This includes materials known as hydrotropes, an example of which is sodium toluene sulfonate.

Inverse emulsion polymerization is a standard chemical process known to those skilled in the art. In general, an inverse emulsion polymerization process is conducted by 1) preparing an aqueous solution of the monomers, 2) adding the aqueous solution to a hydrocarbon liquid containing appropriate emulsification surfactant(s) to form an inverse monomer emulsion, 3) subjecting the monomer emulsion to free radical polymerization, and 4) optionally adding a breaker surfactant to enhance the inversion of the emulsion when added to water.

Inverse emulsions are typically water soluble polymers, based upon non-ionic monomers such as acrylamide; methacrylamide; N-alkylacrylamides, such as N-methylacrylamide; N,N-dialkylacrylamides, such as N,N-dimethylacrylamide; methyl acrylate; methyl methacrylate; acrylonitrile; N-vinyl methylacetamide; N-vinylformamide; N-vinyl methylformamide; vinyl acetate; N-vinyl pyrrolidone; hydroxyalky(meth) acrylates such as hydroxyethyl(meth) acrylate or hydroxypropyl(meth) acrylate; mixtures of any of the foregoing, and the like. Copolymers, containing 2 or more different monomers, can also be prepared. Moreover, the copolymer may contain one or more anionic or cationic monomers. The resultant copolymer can be non-ionic, cationic, anionic, or amphoteric (contains both cationic and anionic charge). Ionic water soluble polymers, or polyelectrolytes, are produced by copolymerizing a non-ionic monomer with an ionic monomer, or by post polymerization treatment of a non-ionic polymer to impart ionic functionality.

Exemplary cationic monomers include, but are not limited to, cationic ethylenically unsaturated monomers such as the diallyldialkylammonium halides, such as diallyldimethylammonium chloride; the (meth)acrylates of dialkylaminoalkyl compounds, such as dimethylaminoethyl (meth)acrylate, diethylaminoethyl (meth)acrylate, dimethyl aminopropyl (meth)acrylate, 2-hydroxydimethyl aminopropyl (meth)acrylate, aminoethyl (meth)acrylate, and the salts and quaternaries thereof; the N,N-dialkylaminoalkyl(meth)acrylamides, such as N,N-dimethylaminoethylacrylamide, and the salt and quaternaries thereof and mixture of the foregoing and the like.

Exemplary anionic monomers include, but are not limited to, the free acids and salts of: acrylic acid; methacrylic acid; maleic acid; itaconic acid; acrylamidoglycolic acid; 2-acrylamido-2-methyl-1-propanesulfonic acid; 3-allyloxy-2-hydroxy-1-propanesulfonic acid; styrene sulfonic acid; vinylsulfonic acid; vinylphosphonic acid; 2-acrylamido-2-methylpropane phosphonic acid; and mixtures of any of the foregoing and the like.

Some emulsions are more difficult to break than others due to the surfactants used to make the emulsion. The emulsification surfactant or emulsification surfactant mixture used in the polymerization systems of interest are generally oil soluble. These emulsification surfactants typically have a range of HLB (Hydrophilic Lipophilic Balance) values that is dependent on the overall composition. One or more emulsification surfactants can be used. The choice and amount of the emulsification surfactant(s) are selected in order to yield an inverse monomer emulsion for polymerization. Emulsification surfactants used in emulsion polymerization systems are known to those skilled in the art. Exemplary emulsification surfactants include, but are not limited to, sorbitan monooleate, sorbitan sequioleate, sorbitan trioleate, polyoxyethylene sorbitan monooleate, di-2-ethylhexylsulfosuccinate, oleamido-propyldimethylamine, sodium isostearyl-2-lactate of mixtures thereof. The emulsification surfactant(s) of the polymerization products of interest may include at least one diblock or triblock polymeric surfactant. It is known that these surfactants are highly effective emulsion stabilizers, but can be difficult to invert. Exemplary diblock and triblock polymeric emulsification surfactants include, but are not limited to, diblock and triblock copolymers based on polyester derivatives of fatty acids and poly[ethyleneoxide] (e.g., Hypermer® B246SF, Uniqema, New Castle, Del.), diblock and triblock copolymers of ethylene oxide and propylene oxide, (e. g. Pluronic® F-127 and Pluronic® 25R2 (BASF Corp., Mt. Olive, N.J.) diblock and triblock copolymers based on polyisobutylene succinic anhydride and poly[ethyleneoxide], reaction products of ethylene oxide and propylene oxide with ethylenediamine, mixtures of any of the foregoing and the like. The diblock and triblock copolymers emulsification surfactants can be based on polyester derivatives of fatty acids and poly[ethyleneoxide].

In one example of an emulsion system that is difficult to break, a diblock or triblock emulsification surfactant is the primary emulsification surfactant of the emulsification system. A secondary emulsification surfactant can be added to ease handling and processing, to improve emulsion stability, or to alter the emulsion viscosity. Examples of secondary emulsification surfactants include, but are not limited to, sorbitan fatty acid esters, ethoxylated sorbitan fatty acid esters, polyethoxylated sorbitan fatty acid esters, the ethylene oxide and/or propylene oxide adducts of alkylphenols, the ethylene oxide and/or propylene oxide adducts of long chain alcohols or fatty acids, mixed ethylene oxide/propylene oxide block copolymers, alkanolamides, mixtures thereof and the like.

Inversion of an inverse emulsion polymerization product is typically not a difficult process. To facilitate inversion, surfactants, termed breaker surfactants, are typically added to the product after polymerization. In addition to the breaker surfactant, the addition of the large volume of water and some mechanical energy are typically sufficient to facilitate inversion of most products. It is known that vigorous agitation promotes inversion. However, it has been observed that some polymer emulsions are considerably more difficult to invert than other products. The difficulties in inversion manifest themselves in a much slower viscosity build. Without being bound to any theory, it is believed that this is due, in part, to the formation of multiple emulsions and/or polymer aggregates. Certain monomers due to their amphophilic nature can provide a contribution to the stability of the emulsion. Furthermore, certain emulsification surfactants provide a high degree of emulsion stability.

Surfactant products such as Hypermer® B246SF are marketed as a product suitable for use in high monomer content emulsions, where emulsion stability is a critical issue. This polymeric emulsification surfactant undergoes multiple and extensive interaction with both phases of the emulsion. This results in a very stable interfacial layer, leading to an emulsion with good mechanical stability. A consequence of this stability is that the emulsion becomes difficult to disrupt and, hence, invert. Product literature from Uniqema confirms that these surfactants provide a more stable emulsion for polymerization than conventional materials such as sorbitan esters and polyoxyethylene derivatives and that inversion is poor and requires customized inversion systems.

Certain monomers, though water soluble, have a more hydrophobic nature than other monomers. These monomers sometimes referred to as 'amphophilic monomers', can, by virtue of their more amphophilic nature, become associated at the interfacial regions and impart some degree of surface activity that can impact inversion. By a more amphophilic material, it is meant that there are regions of the molecule that are less compatible with water. Examples of such monomers include those that have an aromatic ring or an aliphatic moiety. Exemplary amphophilic monomers include, but are not limited to; vinylbenzyl trimethylammonium chloride; styrene sulfonic acid; salts of styrene sulfonic acid, examples of which include, but are not limited to, ammonium styrene sulfonate, sodium styrene sulfonate; fatty alkyl or alkyl polyoxyethyl (meth)acrylic acid esters, examples of which include, but are not limited to, lauryl polyoxyethyl methacrylate, behenylethoxy (meth)acrylate, and methyl polyoxyethyl methacrylate; vinyl alkoxylates; allyl akloxylates; allyl polyoxyalkylene sulfates, examples of which include, but are not limited to, alkali metal salts of phenyl polyolether sulfate; and monomers containing fluorine atoms, examples of which include, but are not limited to, trifluoroethyl (meth)acrylate. Polymer emulsions made using such amphophilic monomers exhibit a high degree of stability imparted by the monomer and therefore are difficult to break.

Typical breaker surfactants include, but are not limited to, linear and branched alcohol ethoxylates, ethoxylated sorbitans, nonylphenol exhoxylates, ethoxylated castor oil, and the like. These surfactants, when utilized as the sole breaker system, provide poor inversion for the type of inverse emulsion polymers described herein that contain polymeric emulsification surfactants and/or amphophilic monomers.

It has been observed that the inverse emulsion polymers as described in the example formulations do not easily invert in that the polymer is slow to build viscosity. In other words, it takes a relatively long time to reach maximum viscosity. The poor inversion properties also result in the formation of insoluble gels. The net result is difficult product handling and reduced performance properties. It is noted, in contrast, that other many other inverse emulsion polymers invert easily and reach maximum viscosity in a much shorter time period.

An optional substitute material for the polymeric breaker surfactant is an ethoxylated castor oil that has been heat treated such that a higher molecular weight fraction or oligemeric fraction is produced. The ethoxylated castor oil is reacting when heated to produce a fraction of material that has a higher molecular weight then the unheated material. The higher molecular weight fraction causes an increase in the weight average and z average molecular weight of the material. The resultant breaker surfactant is more effective than the unmodified surfactant. This breaker surfactant can be used alone or in combination with another breaker surfactant. One example is ethoxylated castor oil that has been heat treated such that a small fraction of oligomer is produced. Exemplary ethoxylated castor oils include, but are not limited to Alkamuls® EL 719 (a product of Rhodia, Cranbury, N.J.) and Surfonic® CO-42 (a product of Huntsman LLC, Austin, Tex.). It is noted that while ethoxylated castor oils are not particularly effective, the performance is greatly enhanced by a small level of oligomeric material. This oligomeric material can be produced by heating the material, in a sealed container, for about 17 days at 120° C. Alternatively, oligomeric materials can be prepared by heating the material, for at least about 8 hours, in a glass reactor with air sparge at 150° C.

The ethoxylated castor oil breaker surfactant system can be used as breaker surfactants for inverse emulsion water soluble or water compatible polymer products that are difficult to invert. These breaker surfactants are also effective in most inverse emulsion polymerization products.

A key attribute of any chemical species is its molecular weight. Polymers are further distinguished by the existence of a distribution of chain length. For example, it is normal to state that the molecular weight of a polymer is 50,000 or that the degree of polymerization is 700. These values are averages, for not every chain is composed of exactly the same number of monomer units, but that the average of all the chains is that value, with some chains being longer and others shorter. It is recognized that several different values can be used as the molecular weight. This is because a number of different averages, some weighted, are used to provide a better indication of molecular size, for the longer chains have a greater impact on the physical properties of the polymeric material. The number average molecular weight, $M_n$, is effectively a count of the number of molecules in a known mass. The weight average molecular weight, $M_w$, is higher in that each molecule contributes to $M_w$ in proportion to the square of its mass. As heavier (larger) molecules contribute more to $M_w$ than lighter ones, $M_w$ is always greater than $M_n$. Furthermore, chemical or physical processes that would increase the molecular weight of a sample would increase $M_w$ to a greater extent than $M_n$. A degradative process would also have a larger effect on $M_w$.

It is noted that the formula used to calculate the weight average molecular weight is derived from the number average by multiplying each term by the molecular weight for each population of molecules of the sample molecular weight. Repetition of this process yields the z-average molecular weight, $M_z$. The key consequence is that if the molecular weight of a fraction of the chains is increased, the increase in $M_z$ is greater than that for $M_w$, which, in turn, is greater than that for $M_n$. The heat treated ethoxylated castor oil surfactant has a higher $M_w$ and $M_z$ than the unmodified surfactant, and in turn provides an improvement in inversion efficiency.

EXAMPLES

Example 1

Preparation of Difficult to Invert Inverse Emulsion Polymer

A representative inverse emulsion polymerization was prepared as follows. To a suitable reaction flask equipped with an overhead mechanical stirrer, thermometer, nitrogen sparge tube, and condenser was charged an oil phase of paraffin oil (135.0 g, Exxsol® D80 oil, Exxon, Houston, Tex.) and emulsification surfactants (4.5 g Atlas® G-946 and 9.0 g Hypermer® B246SF; products of Uniqema, New Castle, Del.). The temperature of the oil phase was then adjusted to 37° C.

An aqueous phase was prepared separately which comprised 53-wt. % acrylamide solution in water (126.5 g), acrylic acid (68.7 g), deionized water (70.0 g), and Versenex 80 (Dow Chemical, Midland, Mich.) chelant solution (0.7 g). The aqueous phase was then adjusted to pH 5.4 with the addition of ammonium hydroxide solution in water (33.1 g, 29.4 wt. % as $NH_3$). The temperature of the aqueous phase after neutralization was 39° C.

The aqueous phase was then charged to the oil phase while simultaneously mixing with a homogenizer to obtain a stable water-in-oil emulsion. This emulsion was then mixed with a 4-blade glass stirrer while being sparged with nitrogen for 60 minutes. During the nitrogen sparge the temperature of the emulsion was adjusted to 50±1° C. Afterwards, the sparge was discontinued and a nitrogen blanket implemented.

The polymerization was initiated by feeding a 3-wt. % AIBN solution in toluene (0.213 g) over a period of 2 hours. This corresponds to an initial AIBN charge as AIBN of 250 ppm on a total monomer basis. During the course of the feed the batch temperature was allowed to exotherm to 62° C. (~50 minutes), after which the batch was maintained at 62±1° C. After the feed the batch was held at 62±1° C. for 1 hour. Afterwards 3-wt. % AIBN solution in toluene (0.085 g) was then charged in under one minute. This corresponds to a second AIBN charge as AIBN of 100 ppm on a total monomer basis. Then the batch was held at 62±1° C. for 2 hours. The batch was then cooled to room temperature.

Example 2

Preparation of a Difficult to Invert Inverse Emulsion Polymer

A representative inverse emulsion polymerization was prepared as follows. To a suitable reaction flask equipped with an overhead mechanical stirrer, thermometer, nitrogen sparge tube, and condenser was charged an oil phase of paraffin oil (139.72 g, Escaid® 110 oil, Exxon—Houston, Tex.) and emulsification surfactants (3.75 g Cirrasol® G-1086 and 11.25 g Span® 80, both from Uniqema—New Castle, Del.).

An aqueous phase was prepared separately which comprised 50 wt. acrylamide solution in water (25.66 g, 30 molar % based on total monomer), styrene sulfonic acid, sodium salt powder (87.17 g, 70 molar % based on total monomer), deionized water (231.5 g), and Versenex® 80 (Dow Chemical) chelant solution (0.14 g). The pH of the aqueous solution was approximately 10.

The aqueous phase was then charged to the oil phase while simultaneously mixing with a homogenizer to obtain a stable water-in-oil emulsion. This emulsion was then mixed with a 4-blade glass stirrer while being sparged with nitrogen for 60 minutes. During the nitrogen sparge the temperature of the emulsion was adjusted to 57±1° C. Afterwards, the sparge was discontinued and a nitrogen blanket implemented.

The polymerization was initiated by feeding a 3 wt. % AIBN solution in toluene corresponding to an initial AIBN charge of 75 ppm on a total monomer molar basis. Four hours after the initial AIBN charge, a 3 wt. % AIBN solution in toluene corresponding to a second AIBN charge of 75 ppm on a total molar monomer basis, was charged into the reactor over ~30 seconds. Then the batch was held at 57±1° C. for 1.5 hours. The final AIBN charge, a 3 wt. % AIBN solution in toluene corresponding to a final AIBN charge of 100 ppm on a total molar monomer basis, was charged into the reactor over ~30 seconds. The batch was then heated to 65±1° C. and held of over 0.5 hours. The batch was then cooled to room temperature.

Example 3

Inversion Time

The inversion time of an inverse emulsion polymer was determined using three different tests: the first test, called the vortex test, involves placing 98 ml. of deionized water into a 250 ml plastic beaker. A mechanical agitator equipped with a 2 inch diameter three-blade propeller (Cole Parmer, Vernon Hills, Ill.) was centered in the beaker, and the blades were positioned at a height of 0.25 inches from the bottom of the breaker. The agitator was operated at a speed of 500 rpm to produce a vortex, such that the low point of the vortex was even with the bottom of the beaker, then 2 ml of emulsion polymer quickly introduced, using a syringe, into the vortex. The time required for loss of vortex after the polymer was introduced, where the surface of the polymer solution is completely horizontal and no vortex is present, was measured as the inversion time. A shorter inversion time indicates more desirable inversion properties. An inversion time of less than one minute is desired.

The second test, called the torque test, measures the viscosity of a 1% solution of the emulsion as a function of time. This device consists of a mixer equipped with a T-shaped blade (53 mm span and 13 mm wide) and a 1 pint stainless steel cup (inside diameter 75 mm) placed on a torque sensing platform.

The measurements were carried at room temperature as follows. Measure 300 mL of deionized water into a graduated cylinder and transferred to the stainless steel cup. The mixer was turned on next and the speed set to 800+/−10 RPM. The data logging was initiated at this point and allowed to proceed prior to emulsion addition for 10-30 sec to determined torque baseline. The emulsion was then added using 3 cc plastic disposable syringe and the torque increase recorded for up to 300 seconds. The torque values obtained in this manner were then corrected for baseline and the data used either for determining effective inversion time or for direct comparison of one formulation to another.

One observes a rapid increase in torque followed by a plateau that slowly drifts upward. This drift makes determining plateau difficult and precludes from defining inversion time as the time necessary to reach the plateau. It is useful to define inversion by a single number in order to be able to report data in a concise manner. Therefore, we define inversion time as the time necessary for the normalized torque values to exceed 0.01 5mV. This torque value corresponds to substantial inversion at which vortex ceases to exist. A shorter inversion time indicates more desirable inversion properties. As with the vortex test, an inversion time of less than one minute is desired.

The third test is the conductivity test. The conductivity test is conducted in a similar manner to the vortex test, with the following revisions. After the polymer emulsion is introduced into the vortex, the solution is allowed to mix for 30 seconds. The agitator is then removed, and immediately an electrode from a conductivity meter (Model no. 32, YSI Incorporated, Yellow Springs, Ohio) is inserted into the solution. The conductivity is recorded at a time of one minute after the initial emulsion addition to the water. The conductivity reading at one minute is then compared to the equilibrium conductivity of the polymer solution, which has been determined for each specific polymer by continued mixing for several hours time until a constant conductivity value is obtained. A higher conductivity is desired at one minute, as this is an indication that the polymer has sufficiently dispersed into the aqueous solution.

The example inverse emulsion polymer samples were dosed with breaker surfactant to conduct inversion tests as follows. For the vortex and conductivity tests, 50 ml of emulsion, made as described above, was placed in a plastic beaker; a magnetic stir bar was used for agitation. The desired amount of breaker surfactant(s) was added using a pipette. The sample was mixed for 10-15 minutes at a speed that caused the formation of a vortex.

The second sample preparation method was used to prepare samples for the torque test. The desired amount of breaker surfactant was placed in a vial to which the emulsion was added. The total amount was 10-20 g. The material was mixed using a laboratory vortex mixture for 60 seconds. The sample was left undisturbed for at least 10 minutes prior to testing.

Data

The data in Tables 1-3 were generated utilizing the inverse emulsion polymer of Example 1.

TABLE 1

INVERSION TIME DATA USING THE VORTEX TEST

| Polymeric Breaker Surfactant | Amount[a], wt. % | Secondary Breaker Surfactant | Amount[a], wt. % | Ratio of Polymeric: Secondary Surfactant | Inversion Time, (min) |
|---|---|---|---|---|---|
| | | Alcohol ethoxylate[d] | 2 | — | 3.5 |
| | | Ethoxylated Ester of sorbitan[d] | 2 | — | 3 |
| Polyglycol[c] | 0.1 | Ethoxylated Ester of sorbitan[d] | 1.5 | (1:15) | 0.5 |
| Polyglycol[c] | 0.1 | Alcohol ethoxylate[b] | 1.5 | (1:15) | 1.3 |
| Block Copolymer[e] | 1.5 | Alcohol ethoxylate[b] | 1.5 | (1:1) | 0.1 |
| Block Copolymer[e] | 0.5 | Alcohol ethoxylate[b] | 1.5 | (1:3) | 3.0 |
| | | Ethoxylated Ester of sorbitan(b) + Alcohol ethoxylate[b] | 1.5 + 1.5 | | >6.0 |

TABLE 1-continued

INVERSION TIME DATA USING THE VORTEX TEST

| Polymeric Breaker Surfactant | Amount[a], wt. % | Secondary Breaker Surfactant | Amount[a], wt. % | Ratio of Polymeric: Secondary Surfactant | Inversion Time, (min) |
|---|---|---|---|---|---|
| Polyglycol[c] | 1.0 | — | — | — | >6.0 |
| Polyglycol[c] | 2.0 | — | — | — | >6.0 |
| Block Copolymer[e] | 2.0 | — | — | — | 3.5 |
| Block Copolymer(f) | 0.5 | Ethoxylated Ester of sorbitan[b] | 1.5 | (1:3) | 1 |

[a]Wt % of the 'breaker' surfactant in the final emulsion
[b]Surfonic ® L24-7, a product of Huntsman, Austin, TX
[c]Polyglycol PT 7200, a product of Dow Chemical, Midland, MI
[d]Cirrasol ® G-1086, a product of Uniqema, New Castle, DE
[e]Pluronic ® L-62, a product of BASF, Mount Olive, NJ
(f)Pluronic 31R1, a product of BASF, Mount Olive, NJ.

The inversion data of Table 1 clearly illustrates the poor inversion of the alcohol ethoxylate, the ethoxylated sorbitan, and the polymeric breaker surfactants when utilized as single breaker surfactants, where the inversion time is generally greater than three minutes. When the inventive process is employed, and combinations of breaker surfactants are utilized, a significant improvement in the inversion time is observed. The inversion time of the combination of surfactants is more effective than the individual surfactants, and thus an unexpected, synergistic effect has been discovered.

TABLE 2

INVERSION TIME USING THE TORQUE TEST

| Polymeric Breaker Surfactant | Amount[a], wt. % | Secondary Breaker Surfactant | Amount[a], wt. % | Ratio of Polymeric: Secondary Surfactant | Inversion Time (min) |
|---|---|---|---|---|---|
| | | Alcohol Ethoxylate[b] | 2 | — | 3.5 |
| | | Ethoxylated Ester of Sorbitan[d] | 2 | — | 2.2 |
| Polyglycol[c] | 0.05 | Ethoxylated Ester of sorbitan[d] | 1.95 | (1:19) | 0.5 |
| Polyglycol[c] | 0.5 | Alcohol Ethoxylate[b] | 3.0 | (1:6) | 2.3 |
| Block Copolymer[e] | 1.5 | Alcohol Ethoxylate[b] | 1.5 | (1:1) | 0.1 |
| Block Copolymer(f) | 1 | Fatty acid ethoxylate(g) | 1.5 | (1:1.5) | 1 |

[a]Wt. % of the 'breaker' surfactant in the final emulsion
[b]Surfonic ® L24-7, a product of Huntsman, Austin, TX
[c]Polyglycol PT 7200, a product of Dow Chemical, Midland, MI
[d]Cirrasol ® G-1086, a product of Uniqema, New Castle, DE
[e]Pluronic ® L-62, a product of BASF Corporation, Mount Olive, NJ
(f)Pluronic ® 25R4, a product of BASF Corporation, Mount Olive, NJ.
(g)Pegosperse ® 600 DOT, a product of Lonza Group, Allendale, NJ.

The inversion data of Table 2 clearly illustrates the poor inversion of the alcohol ethoxylate and the ethoxylated sorbitan when utilized as single breaker surfactants, where the inversion time is generally greater than two minutes. When the inventive process is employed, and combinations of breaker surfactants are utilized, significant improvements in the inversion time is observed. The inversion time of the combination of surfactants is more effective than the individual surfactants.

Examples: 4-6

Ethoxylated Castor Oil

To a 250 ml round bottom flask containing a magnetic stirrer was added 30 g. of Alkamuls® EL 719 ethoxylated castor oil. Air was bubbled slowly through the liquid while it was heated, using a heating mantle, to 150° C. for 16 hours. The color of this material, denoted as example 4, was observed to darken as a function of time during the heating period.

A second sample, denoted as example 5, was prepared by the same process, with the exception that nitrogen gas was used instead of air. It was observed that the sample also darkened with time, but appeared to slow down, such that the sample was significantly lighter than the first sample.

The sample denoted as example 6, in tables 3 and 4, is the untreated (control), Alkamuls® EL 719.

It was determined, as shown in Table 3, that there is a shift in molecular weight with heating.

TABLE 3

| Molecular Weight Values[a] | | | |
|---|---|---|---|
| Example | $M_n$ | $M_w$ | $M_z$ |
| 4 | 2500 | 6000 | 13000 |
| 5 | 2500 | 3700 | 5200 |
| 6 (Control) | 2500 | 3400 | 4700 |

[a]The molecular weight was determined using size exclusion chromatography using Waters HR (High Resolution) columns (a product of Waters Corporation, Milford, MA) and a refractive index detector; polystyrene standards were used for calibration. The mobile phase was tetrahydrofuran contained 250 ppm BHT; the polymer concentration was 0.25%

These data indicate that the heat-treatment results in the production of a higher molecular weight fraction. While changes in the molecular weight can be induced by heating in an inert environment, the changes are more dramatic when heated in the presence of air.

A sample of emulsion was prepared with the emulsion of example 1, as described above, for use in the torque test. The addition level was 5% (by weight) based on total emulsion. Inversion was measured by the torque test.

TABLE 4

| | Inversion Data | |
|---|---|---|
| Breaker | Inversion Time | |
| Surfactant | (Min) | (Sec)[a] |
| Example 4 | 0.5 | 30 |
| Example 5 | 1.1 | 65 |
| Example 6 | 1.6 | 95 |

[a]Inversion time data are the same, but just expressed in different units.

The data in Table 4 indicate that the heat treatment results in the production of a higher molecular weight fraction that provides better activity as a breaker surfactant.

Example 7

Inversion Tests

Another series of inversion tests were conducted utilizing the poly(styrene sulfonate) from inverse emulsion Example 2 and the conductivity test.

TABLE 5

| Example # | Polymeric Breaker Surfactant | Amount, wt. % (a) | Secondary Breaker Surfactant | Amount, wt. % (a) | Conductivity, 1 min. mix, μS/cm |
|---|---|---|---|---|---|
| 1 | | | Alcohol ethoxylate (b) | 3 | 15 |
| 2 | Block copolymer (c) | 3 | — | | emulsion gelled |
| 3 | Block copolymer (c) | 0.3 | Alcohol ethoxylate (b) | 2.7 | 164 |
| 4 | | — | Branched alcohol ethoxylate (d) | 3 | 20 |
| 5 | Block copolymer (c) | 0.5 | Branched alcohol ethoxylate (d) | 2.5 | 220 |
| 6 | Sample mixed to equilibrium conductivity. | | | | 570 |

(a) Wt. % of the 'breaker' surfactant in the final emulsion
(b) Surfonic ® L24-7, a product of Huntsman, Austin, TX
(c) Tetronic ® 701, a product of BASF Corporation, Mount Olive, NJ
(d) Surfonic ® TDA-9, a product of Huntsman, Austin, TX.

The inversion data of Table 5 clearly illustrates the poor inversion of the alcohol ethoxylates when utilized as single breaker surfactants and the poor emulsion stability when sufficient levels of the block copolymer surfactant were utilized as the sole breaker surfactant. It should be noted that the breaker system comprised solely of the alcohol ethoxylate demonstrated white beads upon inversion, an indication of the very poor inversion properties of the poly(styrene sulfonate) of emulsion example 2. When the inventive process is employed, and combinations of breaker surfactants are utilized, significant improvements in the inversion time is observed, and the conductivity is approximately half of the equilibrium value. It is noted that no visible gels or beads were present with the inventive process. The inversion time of the blend of surfactants is more effective than the individual surfactants.

What is claimed is:

1. A method of inverting a water in oil polymer emulsion comprising (a) providing a water in oil emulsion having a water compatible polymer in the aqueous phase, (b) contacting the water in oil polymer emulsion with an effective amount of a surfactant combination of at least two breaker surfactants comprising at least one polymeric breaker surfactant and a second non-polymeric breaker surfactant, wherein the polymeric breaker surfactant contains one or more polymeric hydrophilic segments, and one or more polymeric hydrophobic segments, said segments being comprised of more than 5 monomer units covalently bonded to each other, and (c) inverting the emulsion.

2. The method of claim 1 wherein the at least one polymeric breaker surfactant has two or more polymeric hydrophilic segments.

3. The method of claim 1 wherein at least one of the one or more polymeric hydrophilic segments is a polyglycol segment.

4. The method of claim 1 wherein the at least one polymeric breaker surfactant containing one or more hydrophilic segments is an ethylene oxide/propylene oxide copolymer.

5. The method of claim 1 wherein the at least one polymeric breaker surfactant is an ethylene oxide/propylene oxide copolymer produced with a diol starter.

6. The method of claim 1 wherein the at least one polymeric breaker surfactant is an ethyleneoxide/propylene oxide copolymer produced with an ethylene diamine starter.

7. The method of claim 1, wherein the at least one polymeric breaker surfactant is an ethyleneoxide/propylene oxide copolymer produced with a trimethylol propane starter or in the alternative produced with a glycerol starter.

8. The method of claim 1 wherein the second breaker surfactant is selected from the group consisting of alcohol ethyoxylate, ethoxylated fatty acid esters, ethoxylated sorbitan fatty acid esters, ethoxylated esters of fatty acid and combinations thereof.

9. The method of claim 1 wherein the total amount of polymeric breaker surfactant and second breaker surfactant is less than about 10% by weight based on the total weight of the emulsion.

10. The method of claim 9 wherein the total amount of polymeric breaker surfactant and second breaker surfactant is less than about 5% by weight based on the total weight of the emulsion.

11. The method of claim 1 wherein the polymeric surfactant comprises at least about 2.0 wt % of the breaker surfactant combination.

12. The method of claim 11 wherein the polymeric surfactant comprises at least about 2.0 to 98 wt % of the breaker surfactant combination.

13. The method of claim 12 wherein the polymeric surfactant comprises at least about 2.5% to 75 wt % of the breaker surfactant combination.

14. The method of claim 1 wherein the water compatible polymer comprises at least one amphophilic monomer.

15. The method of claim 14 wherein the amphophilic monomer is selected from the group consisting of vinylbenzyl trimethylammonium chloride; styrene sulfonic acid; salts of styrene sulfonic acid; fatty alkyl or alkyl polyoxyethyl (meth)acrylic acid esters; vinyl alkoxylates; allyl akloxylates; allyl polyoxyalkylene sulfates; and monomers containing fluorine atoms and combinations thereof.

16. The method of claim 1 wherein the water compatible polymer is prepared by a inverse emulsion process comprising emulsification surfactants containing at least one diblock or triblock polymeric surfactant.

\* \* \* \* \*